(12) United States Patent
Ichikawa

(10) Patent No.: US 8,256,547 B2
(45) Date of Patent: Sep. 4, 2012

(54) HYBRID VEHICLE

(75) Inventor: Shinji Ichikawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 598 days.

(21) Appl. No.: 12/448,519

(22) PCT Filed: Feb. 15, 2008

(86) PCT No.: PCT/JP2008/053009
§ 371 (c)(1), (2), (4) Date: Jun. 24, 2009

(87) PCT Pub. No.: WO2008/102856
PCT Pub. Date: Aug. 28, 2008

(65) Prior Publication Data
US 2009/0288896 A1   Nov. 26, 2009

(30) Foreign Application Priority Data
Feb. 20, 2007 (JP) ................. 2007-039576

(51) Int. Cl.
*H02J 7/14* (2006.01)
(52) U.S. Cl. ............ 180/65.29; 180/65.265; 320/132
(58) Field of Classification Search .......... 180/65.29, 180/65.265; 320/132
See application file for complete search history.

(56) References Cited

U.S. PATENT DOCUMENTS

| | | | |
|---|---|---|---|
| 6,127,798 A | | 10/2000 | Lansang et al. |
| 7,928,693 B2 * | | 4/2011 | Hafner et al. ............ 320/132 |
| 8,096,376 B2 * | | 1/2012 | Osawa ............ 180/65.27 |
| 8,116,915 B2 * | | 2/2012 | Kempton ............ 700/291 |
| 2001/0024104 A1 | | 9/2001 | Suzuki |
| 2002/0003417 A1 | | 1/2002 | Bito et al. |
| 2003/0015358 A1 | | 1/2003 | Abe et al. |
| 2009/0115251 A1 * | | 5/2009 | Nakamura et al. ............ 307/32 |
| 2009/0200988 A1 * | | 8/2009 | Bridges et al. ............ 320/137 |
| 2009/0240387 A1 * | | 9/2009 | Kawai et al. ............ 701/22 |
| 2009/0288896 A1 * | | 11/2009 | Ichikawa ............ 180/65.265 |
| 2009/0306841 A1 * | | 12/2009 | Miwa et al. ............ 701/22 |
| 2010/0026237 A1 * | | 2/2010 | Ichikawa et al. ............ 320/109 |
| 2010/0217485 A1 * | | 8/2010 | Ichishi ............ 701/36 |
| 2011/0022222 A1 * | | 1/2011 | Tonegawa ............ 700/232 |
| 2011/0121779 A1 * | | 5/2011 | Ichikawa et al. ............ 320/109 |
| 2011/0181241 A1 * | | 7/2011 | Badger ............ 320/109 |

(Continued)

FOREIGN PATENT DOCUMENTS

JP   A-09-098513   4/1997

(Continued)

OTHER PUBLICATIONS

Decision on Grant issued in Russian Application No. RU 2009135039/11(049347) dated Nov. 17, 2010 (with translation).

*Primary Examiner* — Jeffrey J Restifo

(74) *Attorney, Agent, or Firm* — Oliff & Berridge, PLC

(57) ABSTRACT

An HV-ECU continuously integrates period of no external charge as the time elapsed from latest external charging (last external charging). When ignition is turned on, a stored map is looked-up, and an SOC control center value that corresponds to the period of no external charge is obtained. Charge/discharge management of the power storage unit in HV running mode is executed based on the obtained SOC control center value. When the period of no external charge exceeds a prescribed threshold value, SOC control center value is increased to control center value.

10 Claims, 12 Drawing Sheets

U.S. PATENT DOCUMENTS

| | | | |
|---|---|---|---|
| 2011/0309674 A1* | 12/2011 | Kamachi | 307/10.1 |
| 2012/0041855 A1* | 2/2012 | Sterling et al. | 705/34 |
| 2012/0049792 A1* | 3/2012 | Crombez | 320/109 |

FOREIGN PATENT DOCUMENTS

| | | |
|---|---|---|
| JP | A-2000-032606 | 1/2000 |
| JP | A-2001-268719 | 9/2001 |
| JP | A-2001-314039 | 11/2001 |
| JP | A-2003-032807 | 1/2003 |
| JP | A-2003-047108 | 2/2003 |
| JP | A-2004-229354 | 8/2004 |
| RU | 2 048 309 C1 | 11/1995 |
| WO | WO 02/081255 A1 | 10/2002 |
| WO | WO 2007/018223 A1 | 2/2007 |

* cited by examiner

HYBRID VEHICLE

TECHNICAL FIELD

The present invention relates to a hybrid vehicle capable of charging a power storage unit mounted thereon by an external power supply and, more specifically, to a technique of optimally managing a value of state of charge of the power storage unit, in accordance with the manner of use by the user.

BACKGROUND ART

Recently, in consideration of environmental issues, a hybrid vehicle that runs on efficient combination of an engine and a motor has been put to practical use. Such a hybrid vehicle has a rechargeable power storage unit mounted thereon, to supply electric power to the motor at the start and/or at the time of acceleration, and to recover kinetic energy of wheels on a downhill and/or at the time of braking.

A structure for a hybrid vehicle as such has been proposed, which is electrically connected to an external power supply such as a commercial power supply and allows charging of the power storage unit mounted on the vehicle. The externally chargeable vehicle mentioned above is capable of running using electric power from the external power supply stored in the power storage unit while keeping the engine stopped, for a relatively short distance when, for example, one commutes or goes shopping, whereby general fuel consumption efficiency can be improved. Such a running mode is sometimes referred to as EV (Electric Vehicle) running mode.

When state of charge (SOC) of the power storage unit attains below a prescribed lower limit after the vehicle runs in the EV running mode, the vehicle enters a common HV (Hybrid Vehicle) running mode, allowing engine operation. In the HV running mode, operation output of the engine is used as driving force for running and, in addition, used for a power generating operation to charge the power storage unit.

As an example of a structure for switching between the EV running mode and the HV running mode, Japanese Patent Laying-Open No. 09-098513 discloses a charge and discharge controller for a hybrid electric vehicle, in which initial battery travel distance is ensured and the ratio of power generation running (hybrid running) is reduced, so as to sufficiently attain the advantage of silence, to prevent decrease of mileage by the internal combustion engine for power generation and to reduce exhaust gas.

Different from the charge and discharge controller for a hybrid electric vehicle disclosed in Japanese Patent Laying-Open No. 09-098513 mentioned above, in a vehicle of which power storage unit can be charged by the external power supply, it is preferred to have the value of state of charge (battery charging rate) in the HV running mode kept at a relatively low value. This is to enable storage of as much electric power as possible from the external power supply at the time of charging with the external power supply after running.

The manner of use of a vehicle, however, differs user by user. Specifically, a user may mostly run relatively short distances while another user may run relatively long distances and, therefore, the degree of executing charging operations using an external power supply (charging frequency) differs user by user.

As a result, in a hybrid vehicle that is not very frequently charged with the external power supply, the value of state of charge of the power storage unit is kept relatively low for a longer period of time. The low charged state kept for a long time is not preferable, considering degradation of the power storage unit.

DISCLOSURE OF THE INVENTION

The present invention was made to solve such a problem, and its object is to provide an externally rechargeable hybrid vehicle of which degradation in the power storage unit can be prevented in accordance with the manner of use by the user.

According to an aspect, the present invention provides a hybrid vehicle, including: an engine operating on fuel combustion; power generating means capable of generating electric power, receiving power generated by the operation of the engine; a power storage unit charged by the electric power from the power generating means; driving force generating means for generating driving force from the electric power from at least one of the power generating means and the power storage unit; external charging means electrically connected to an external power supply, for charging the power storage unit by the external power supply; and a control unit for controlling vehicle driving force to be generated in accordance with a driver's request, and for controlling electric power charged/discharged at the power storage unit. The control unit controls in a first running mode until a value of state of charge of the power storage unit attains lower than a prescribed value, and makes a transition to a second running mode when the value of state of charge becomes lower than the prescribed value. In the first running mode, charging of the power storage unit by the power generating means is limited, and in the second running mode, charging of the power storage unit by the power generating means is allowed such that the value of state of charge is maintained in a prescribed range with a control center value being the center. The control unit includes control center value changing means for changing the control center value in accordance with an external charge execution degree as a degree of executing charging of the power storage unit by the external charging means.

In the hybrid vehicle in accordance with this aspect, after the transition to the second running mode allowing charging of the power storage unit by the power generation means, the control center value defining the range, in which the value of state of charge of the power storage unit is maintained, is changed in accordance with the external charge execution degree. Consequently, it becomes possible to prevent the value of state of charge of the power storage unit from being kept at a low value because of low degree of executing charging of the power storage unit by the external charging means, and therefore, it is possible to prevent degradation of the power storage unit.

Preferably, the control unit controls electric power charged/discharged at the power storage unit in accordance with a required charging power characteristic defining electric power necessary for charging the power storage unit in correspondence with the value of state of charge of the power storage unit; and the control center value changing means changes the control center value by changing the required charging power characteristic.

Preferably, the control center value changing means increases the control center value as the external charge execution degree decreases.

Preferably, the control center value changing means determines the external charge execution degree based on at least one of elapsed time and running distance from latest execution of charging of the power storage unit by the external power supply.

Preferably, the control center value changing means changes the control center value if at least one of the elapsed time and the running distance exceeds corresponding prescribed threshold value.

Preferably, the control unit controls electric power charged/discharged at the power storage unit, within a range of allowable charging/discharging characteristic defining maximum charging/discharging electric power allowable in the power storage unit in correspondence with a value of state of charge of the power storage unit; and the allowable charging/discharging power characteristic changes in accordance with the control center value changed by the control center value changing means.

Preferably, the hybrid vehicle in accordance with this aspect further includes a voltage converting unit arranged between the power storage unit and the driving force generating means, for performing voltage conversion between the power storage unit and the driving force generating means. The control unit further includes a control system including at least one control element and for controlling the voltage converting operation at the voltage converting unit; and characteristic of the at least one control element included in the control system changes in accordance with the control center value that is changed by the control center value changing means.

Preferably, the hybrid vehicle in accordance with this aspect further includes power storage unit monitoring means for monitoring the value of state of charge of the power storage unit and if the value of state of charge is outside a prescribed standard range, outputting a signal indicating malfunction of the power storage unit. The standard range used by the power storage unit monitoring means changes in accordance with the control center value that is changed by the control center value changing means.

Preferably, the control center value changing means is enabled or disabled in accordance with an externally input selection command.

According to another aspect, the present invention provides a hybrid vehicle, including: an engine operating on fuel combustion; a power generating mechanism capable of generating electric power, receiving power generated by the operation of the engine; a power storage unit charged by the electric power from the power generating mechanism; a driving force generating mechanism for generating driving force from the electric power from at least one of the power generating mechanism and the power storage unit; an external charging mechanism electrically connected to an external power supply, for charging the power storage unit by the external power supply; and a control unit for controlling vehicle driving force to be generated in accordance with a driver's request, and for controlling electric power charged/discharged at the power storage unit. The control unit controls in a first running mode until a value of state of charge of the power storage unit attains lower than a prescribed value, and makes a transition to a second running mode when the value of state of charge becomes lower than the prescribed value; in the first running mode, charging of the power storage unit by the power generating mechanism is limited, and in the second running mode, charging of the power storage unit by the power generating mechanism is allowed such that the value of state of charge is maintained in a prescribed range with a control center value being the center. The control unit changes the control center value in accordance with an external charge execution degree as a degree of executing charging of the power storage unit by the external charging mechanism.

By the present invention, an externally rechargeable hybrid vehicle of which degradation in the power storage unit can be prevented in accordance with the manner of use by the user can be provided.

BEST MODES FOR CARRYING OUT THE INVENTION

Figure 1:
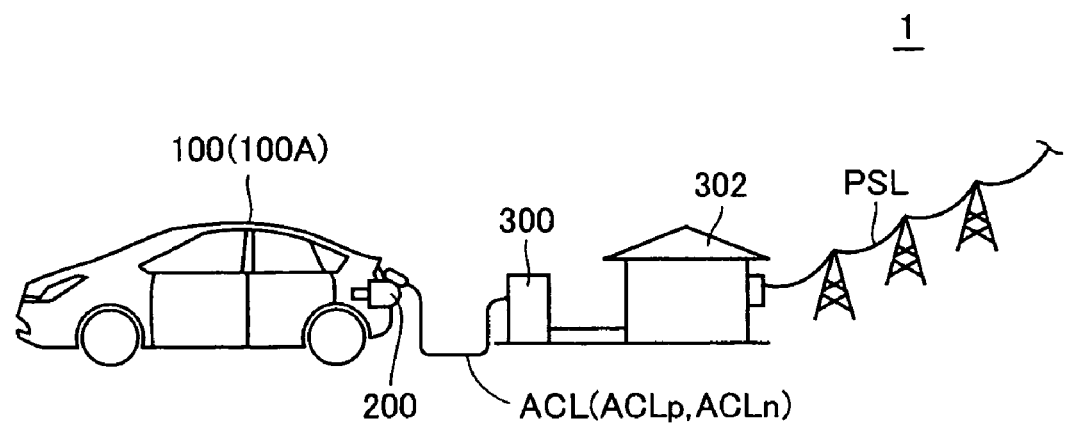
FIG. 1 shows an overall configuration when a power storage unit mounted on a hybrid vehicle in accordance with Embodiment 1 of the present invention is charged by an external power supply.

Embodiments of the present invention will be described in detail with reference to the figures. In the figures, the same or corresponding portions are denoted by the same reference characters and description thereof will not be repeated.

Embodiment 1

Referring to FIG. 1, a hybrid vehicle 100 (hereinafter also simply referred to as a "vehicle 100") has an internal combustion engine (engine) and a motor generator, as will be described later, and runs with driving forces from these adjusted at an optimal ratio. Further, vehicle 100 has a power storage unit (not shown) for supplying power to the motor generator, mounted thereon. The power storage unit can be charged, receiving power generated by an operation of the internal combustion engine, when system of vehicle 100 is active (hereinafter also denoted as "IGON state"), and it can be electrically connected through a connector unit 200 to an external power supply and can be charged thereby, when the system of vehicle 100 is stopped (hereinafter also denoted as "IGOFF state"). In the following description, in order to distinguish from the charging operation of the power storage unit during running of vehicle 100, charging by the external power supply will also be denoted as "external charging."

The connector unit 200 provides a coupling mechanism for supplying commercial power supply as an example of the external power supply to vehicle 100 and, it is connected through a power line ACL formed of a cabtyre cable or the like, to a charging station 300. Connector unit 200 is coupled to vehicle 100 at the time of external charging, and electrically connects a commercial power supply as an example of the external power supply to vehicle 100. On the side of vehicle 100, a connector receiving portion (not shown) to be coupled to connector unit 200 for receiving the commercial power supply is provided.

Charging station 300 takes out the commercial power supply supplied to a house 302 through an external power supply line PSL, and supplies the power to connector unit 200. A housing mechanism for connector unit 200, or a mechanism for winding power line ACL connected to connector unit 200 (both not shown) may be added to charging station 300. Further, an accounting mechanism or a security mechanism for the user may be added to charging station 300.

The external power supply supplied through connector unit 200 to vehicle 100 may be electric power generated by a solar battery panel installed on a roof of house 302.

Figure 2:
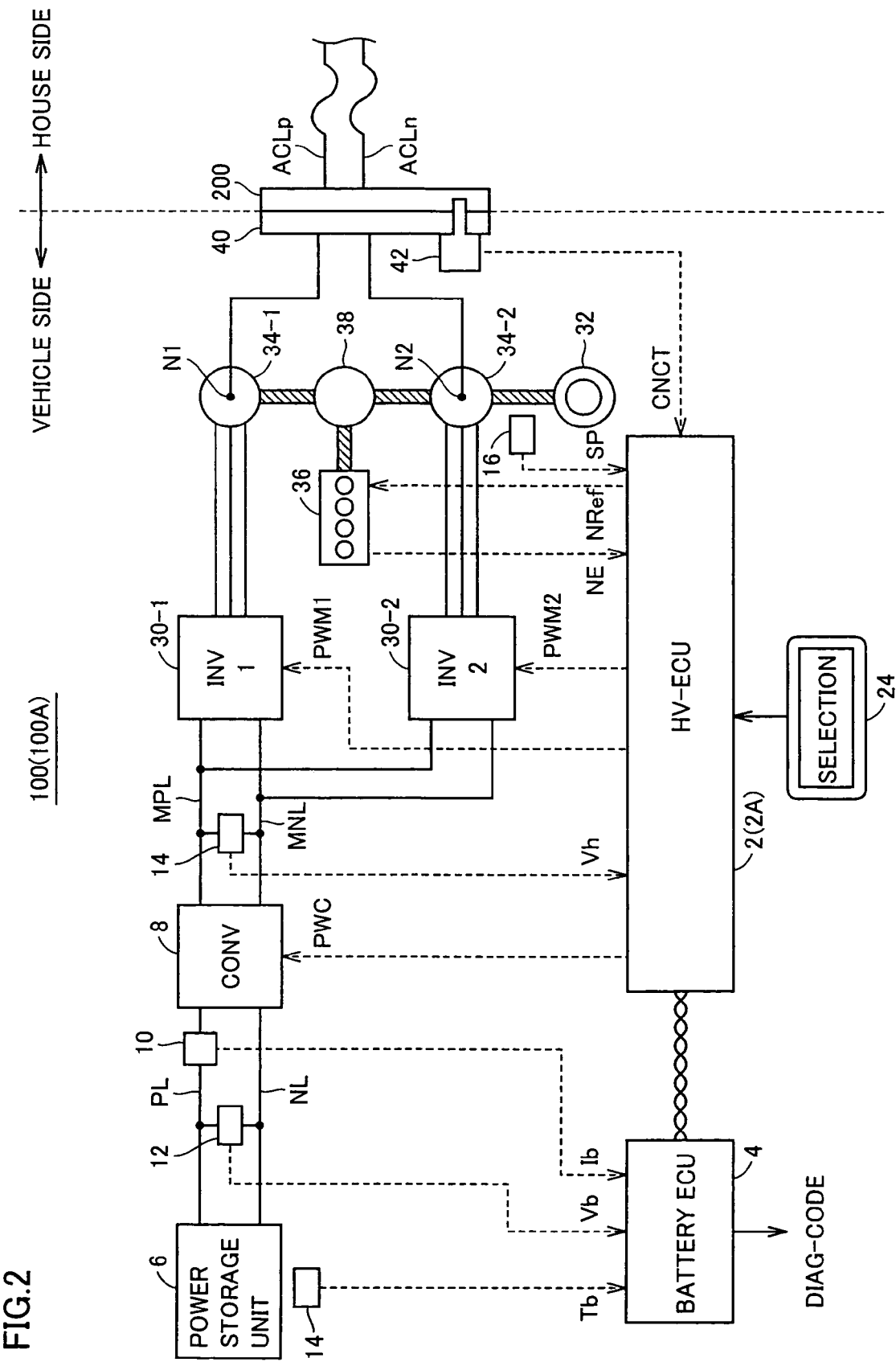
FIG. 2 is a schematic block diagram of a hybrid vehicle in accordance with Embodiment 1 of the present invention.

Referring to FIG. 2, hybrid vehicle 100 in accordance with Embodiment 1 of the present invention includes an internal combustion engine 36, a power split device 38, a first motor generator 34-1, a second motor generator 34-2, a first inverter (INV1) 30-1, a second inverter (INV2) 30-2, a converter (CONV) 8, a power storage unit 6, a battery ECU 4, and an HV-ECU 2. In the following description, the first and second motor generators 34-1 and 34-2 may also be denoted as MG1 and MG2, respectively.

Internal combustion engine 36 operates on combustion of fuel such as gasoline or light oil. The power generated by the operation of internal combustion engine 36 is transmitted to power split device 38 mechanically connected to an output shaft (crankshaft) of internal combustion engine 36.

Power split mechanism 38 is mechanically connected to internal combustion engine 36 and motor generators 34-1 and 34-2, and performs combination and splitting of power between each other. By way of example, power split device 38 is formed of a planetary gear mechanism including three elements of a sun gear, a carrier and a ring gear, and internal combustion engine 36 and motor generators 34-1 and 34-2 are coupled to respective elements. Part of the power generated by internal combustion engine 36 is combined with the power from motor generator 34-2 and transmitted to a driving wheel 32, and the remaining part of the power is transmitted to motor generator 34-1 and converted by motor generator 34-1 to electric power.

A vehicle speed detecting unit 16 is provided adjacent to the rotation shaft of driving wheel 32, and the speed of rotations of driving wheel 32, that is, vehicle speed SP of vehicle 100 is detected.

Motor generator 34-1 functions solely as an electric generator (generator) that receives power generated by the operation of internal combustion engine 36 and generates electric power and, receiving the rotational driving force transmitted via power split device 38, generates electric power.

Motor generator 34-2 functions as an electric motor (motor) that generates driving force from at least one of the electric power generated by motor generator 34-1 and the electric power discharged from power storage unit 6. Rotational driving force generated by motor generator 34-1 is combined with rotational driving force from internal combustion engine 36 by power split device 38, and applied to driving wheel 32. It is noted that motor generator 34-2 also functions as an electric generator (generator) in a braking operation of the vehicle, for example, when the driver operates the brake, and it is capable of regenerating electric power energy from kinetic energy of vehicle 100 and returning the energy to power storage unit 6.

By way of example, motor generators 34-1 and 34-2 are three-phase AC synchronous rotating electric machines having a rotor with embedded permanent magnet. Further, stators of motor generators 34-1 and 34-2 each include a Y- (star-) connected three-phase stator coils. At the time of external charging, to coupling points of respective stator coils, that is, to neutral points N1 and N2, external power is supplied through power line ACL (positive supply line ACLp and negative supply line ACLn).

Inverters 30-1 and 30-2 are electrically connected to motor generators 34-1 and 34-2, respectively, and connected in parallel with converter 8. Inverters 30-1 and 30-2 control electric power exchanged to/from motor generators 34-1 and 34-2, respectively. By way of example, inverters 30-1 and 30-2 are formed of bridge circuits including three-phase arms, and power converting operations thereof are respectively controlled by switching commands PWM1 and PWM2 from HV-ECU2, which will be described later. In the present embodiment, inverter 30-1 and motor generator 34-1 implement the "power generation means" or the "power generating mechanism," and inverter 30-2 and motor generator 34-2 implement the "driving force generation means" or the "driving force generating mechanism."

Further, at the time of external charging, inverters 30-1 and 30-2 operate in a coordinated manner to convert external power supply (single phase AC) supplied to neutral points N1 and N2 of motor generators 34-1 and 34-2, respectively, to DC power and to charge power storage unit 6.

Figure 3:
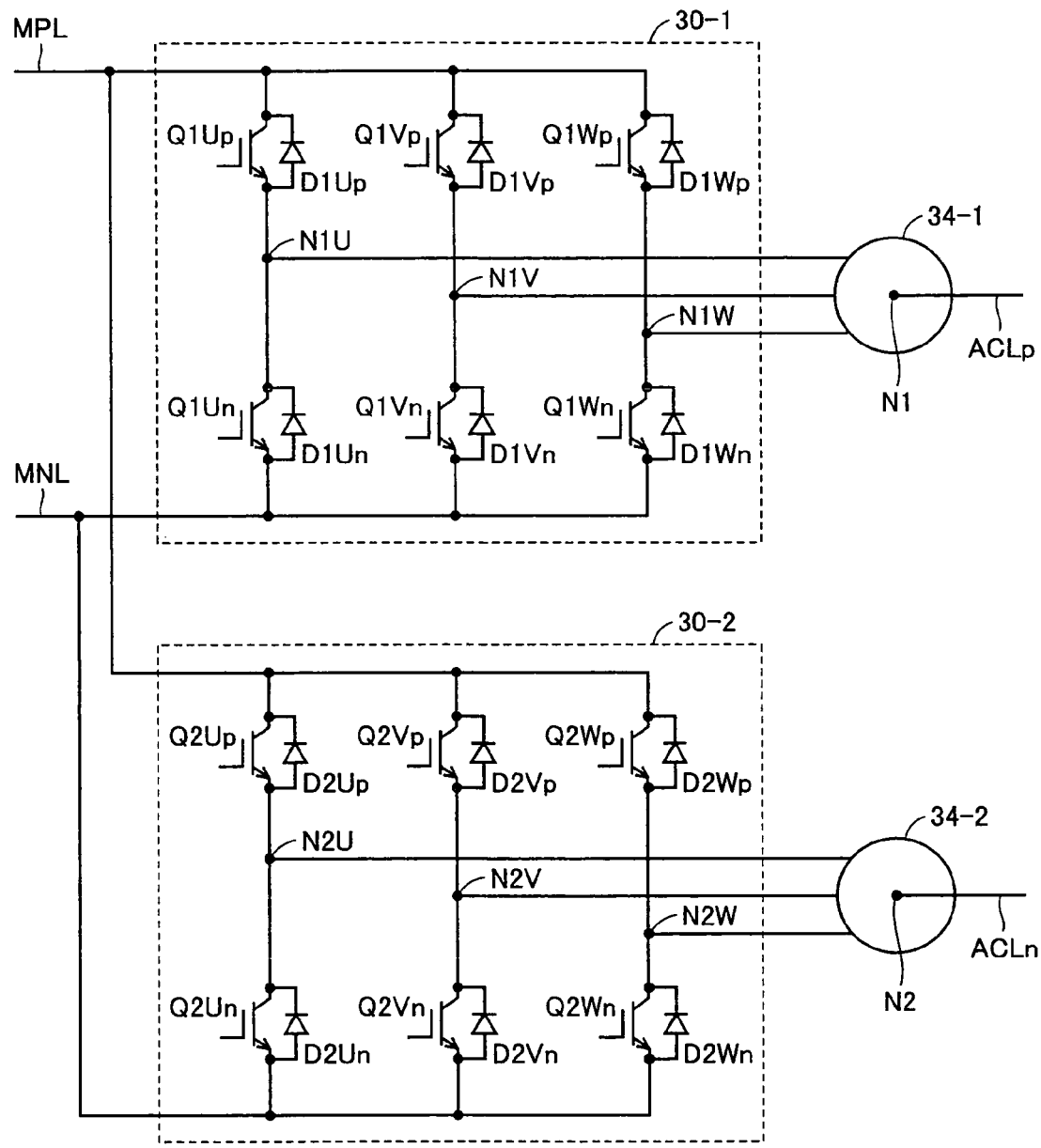
FIG. 3 schematically shows configurations of an inverter and a motor generator.

Referring to FIG. 3, inverter 30-1 includes transistors Q1Up and Q1Un, transistors Q1Vp and Q1Vn, and transistors Q1Wp and Q1Wn, forming U-, V- and W-phase arm circuits, respectively, and each arm circuit is connected between a main positive line MPL and a main negative line MNL. Connection nodes N1U, N1V and N1W of transistors in respective arm circuits are connected to the corresponding stator coils (not shown) of motor generator 34-1, and corresponding phase voltages are supplied to motor generator 34-1. By way of example, transistors Q1Up, Q1Un, Q1Vp, Q1Vn, Q1Wp, and Q1Wn are formed of switching elements such as IGBTs (Insulated Gate Bipolar Transistors).

Further, inverter 30-1 includes diodes D1Up, D1Un, D1Vp, D1Vn, D1Wp, and D1Wn, and each of the diodes is connected in parallel with the corresponding transistor such that it can cause a feedback current to flow from the emitter side to the collector side of the transistor having the same reference character.

While vehicle 100 is running, in inverter 30-1, by switching operations of respective transistors in response to switching command PWM1, power converting operation between DC power and AC power is provided. More specifically, the transistors Q1Up, Q1Vp and Q1Wp on the upper arm side (positive side) connected to main positive line MPL and the transistors Q1Un, Q1Vn and Q1Wn of the lower arm side (negative side) connected to main negative line MNL are selected, one from the upper arm side and one from the lower arm side successively, and the selected two transistors are driven to the ON state. Two transistors forming one same arm circuit are not selected simultaneously.

There are six different combinations of the transistors selected in this manner. Further, by adjusting the period (duty ratio) and phase (timing) of conducting each transistor, the amount of power conversion and the direction of power conversion (DC power to AC power or AC power to DC power) can be controlled.

Similar to inverter 30-1, inverter 30-2 includes transistors Q2Up and Q2Un, transistors Q2Vp and Q2Vn, and transistors Q2Wp and Q2Wn forming U-, V- and W-phase arm circuits, respectively. Connection nodes N2U, N2V and N2W of transistors in respective arm circuits are connected to the corresponding stator coils (not shown) of motor generator 34-2, and corresponding phase voltages are supplied to motor generator 34-2. Further, inverter 30-2 includes diodes D2Up, D2Un, D2Vp, D2Vn, D2Wp, and D2Wn. The power converting operation is the same as that of inverter 30-1 described above and, therefore, detailed description will not be repeated.

Next, operations of inverters 30-1 and 30-2 and motor generators 34-1 and 34-2 at the time of external charging will be described.

When power storage unit 6 is to be charged by the external power supply, inverters 30-1 and 30-2 operate in a "zero-voltage mode", different from the normal switching operation described above. In the "zero-voltage mode," three transistors are collectively switched (turned on or off) in each of the upper side arm and lower side arm. In this operation mode, three switching element on the upper arm side all assume the same switching state (all on or all off), and three transistors on the lower arm side all assume the same switching state.

Figure 4:
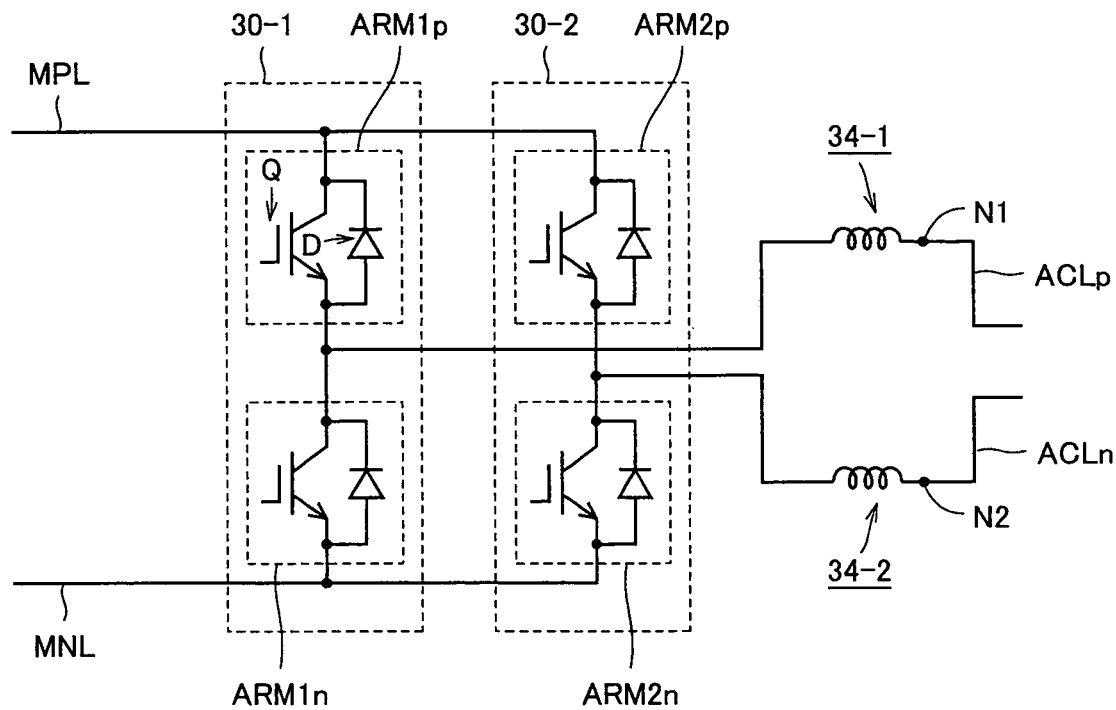
FIG. 4 is a zero-phase equivalent circuit diagram of the inverter and the motor generator in the zero-voltage mode.

FIG. 4 shows a zero-phase equivalent circuit of inverters 30-1 and 30-2 and motor generators 34-1 and 34-2.

Referring to FIG. 4, when inverters 30-1 and 30-2 operate in the zero-voltage mode as described above, the three transistors Q1Up, Q1Vp and Q1Wp and diodes D1Up, D1Vp and D1Wp on the upper arm side of inverter 30-1 are collectively represented as an upper arm ARM1p, and three transistors Q1Un, Q1Vn and Q1Wn and diodes D1Un, D1Vn and D1Wn on the lower arm side of inverter 30-1 are collectively represented as a lower arm ARM1n. Similarly, the three transistors and the diodes on the upper arm side of inverter 30-2 are collectively represented as an upper arm ARM2p, and the three transistors and the diodes on the lower arm side of inverter 30-2 are collectively represented as a lower arm ARM2n.

Specifically, each of the arms ARM1p, ARM1n, ARM2p, and ARM2n includes a transistor Q collectively representing three transistors and a diode D collectively representing three diodes. Therefore, the zero-phase equivalent circuit can be regarded as a single-phase inverter capable of converting the DC power supplied through main positive line MPL and main negative line MNL to a single-phase AC power and capable of converting single-phase AC power input to neutral points N1 and N2 through positive supply line ACLp and negative supply line ACLn to DC power.

Therefore, by controlling switching commands PWM1 and PWM 2 in a coordinated manner to have inverters 30-1 and 30-2 operate as the single phase inverter, it becomes possible to generate DC power for charging power storage unit 6 from the single-phase AC power supplied from the external power supply and to supply the power to main positive line MPL and main negative line MNL.

Again referring to FIG. 2, converter 8 is a voltage converting unit arranged between power storage unit 6 and inverters 30-1 and 30-2, for performing a voltage converting operation between power storage unit 6 and inverters 30-1 and 30-2. More specifically, converter 8 is capable of boosting discharged power (output power) from power storage unit 6 and supplying the result to inverters 30-1 and 30-2, and capable of lowering regenerative power supplied from inverters 30-1 and 30-2 and supplying the result to power storage unit 6. Further, a voltage detecting unit 12 connected between main positive line MPL and main negative line MNL detects a voltage value Vh appearing between these lines.

Converter 8 is provided to make higher the voltage to be supplied to motor generators 34-1 and 34-2 for enlarging operable range (range of rotational speed) of motor generators 34-1 and 34-2. Therefore, depending on the operable range of motor generators 34-1 and 34-2 and on the output voltage of power storage unit 6, a structure not having converter 8 may be adopted.

Further, converter 8 is formed, for example, of a "chopper" type voltage boosting/lowering circuit capable of both voltage boosting operation and voltage lowering operation. The voltage converting operations as such are each controlled by a switching command PWC from HV-ECU 2.

Figure 5:
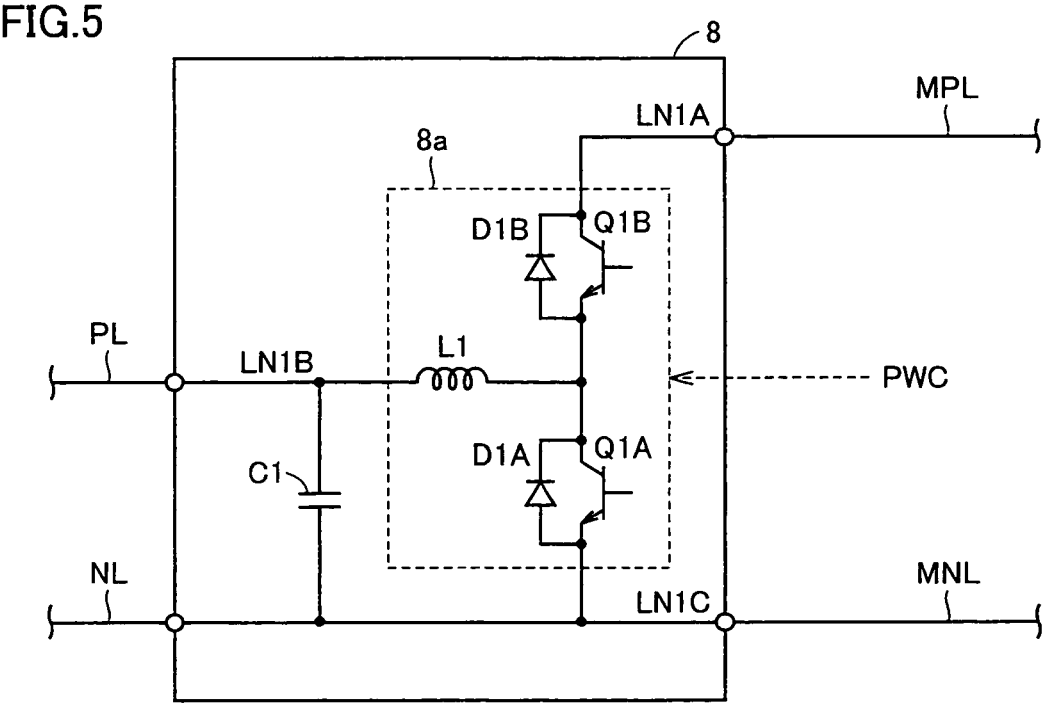
FIG. 5 schematically shows a configuration of a converter.

Referring to FIG. 5, a voltage boosting/lowering circuit 8a forming converter 8 includes a series connected two transistors Q1A and Q1B. The series connected transistors Q1A and Q1B have one end connected to main positive line MPL through a line LN1A and the other end connected to a line LN1C commonly connecting main negative line MNL to a negative line NL1. Further, connection node between transistors Q1A and Q1B is connected to a positive line PL1 through an inductor L1 and a line LN1B. Further, between the collector and emitter of transistors Q1A and Q1B, diodes D1A and D1B are connected in parallel, respectively allowing current flow from the emitter side to the collector side.

Further, between positive line PL and negative line NL, a smoothing capacitor C1 is connected, for reducing AC component included in the power exchanged between power storage unit 6 and converter 8. Further, smoothing capacitor C1 also attains an effect of absorbing rush current generated at the moment when power storage unit 6 and converter 8 are electrically connected, and thereby preventing damage to transistors Q1A and Q1B and diodes D1A and D1B caused by the rush current.

Transistors Q1A and Q1B performing switching operations in response to the switching command PWC provide the voltage boosting and lowering operations. In the voltage boosting operation, transistor Q1B is kept on, while transistor Q1A switches at a prescribed duty ratio. By the switching operation of transistor Q1A, storage and releasing of electromagnetic energy are repeated in inductor L1, and the voltage corresponding to the electromagnetic energy is accumulatively output to the side of main line ML. In the voltage lowering operation, transistor Q1A is kept off, and transistor Q1B switches at a prescribed duty ratio. By the switching operation, current flows in transistor Q1B only in the period corresponding to the duty ratio and, therefore, the voltage lowered in accordance with the duty ratio is output to the positive line PL1 and negative line NL1.

Again referring to FIG. 2, power storage unit 6 is a rechargeable DC power storage element, and it is electrically connected to converter 8 through positive line PL and negative line NL. By way of example, power storage unit 6 is implemented by a secondary battery such as a nickel hydride battery or a lithium ion battery, or an electric double layer capacitor.

When the vehicle is running, power storage unit 6 is charged by the electric power generated by motor generator 34-1, and discharges stored electric power to motor generator 34-2 to generate driving force. At the time of external charging, power storage unit 6 is charged by an external power supply (here, commercial power supply).

Though a hybrid vehicle provided with only one power storage unit 6 is shown as an example in FIG. 2, the number of power storage units 6 is not limited to one. Depending on the running performance required of vehicle 100, a structure mounting a plurality of power storage units may be adopted. In that case, a structure having converters 8 same in number as and corresponding to respective power storage units is preferred.

Further, a current detecting unit 10 inserted to positive line PL detects a current value Ib exchanged between power storage unit 6 and converter 8, and a voltage detecting unit 12 connected between positive line PL and negative line NL detects a voltage value Vb related to charging or discharging of power storage unit 6. Further, a temperature detecting unit 14 is arranged adjacent to a battery cell forming power storage unit 6, and it detects temperature Tb of power storage unit 6. Temperature detecting unit 14 may be adapted to output a representative value of values detected by a plurality of detecting elements arranged corresponding to a plurality of battery cells forming power storage unit 6.

Connector receiving portion 40 is a portion to be connected to connector unit 200 at the time of external charging for receiving the supplied external power to the inside of vehicle 100, and it is formed to allow communication of connector unit 200 to outer surface of vehicle 100. Connector receiving portion 40 is electrically connected to neutral points N1 and N2 of motor generators 34-1 and 34-2, and when connector unit 200 is connected to connector receiving portion 40, a supply path is formed that feeds the external power supplied through positive supply line ACLp and negative supply line ACLn to neutral points N1 and N2.

Further, a monitoring unit 42 is provided at connector receiving portion 40, for monitoring coupling between connector unit 200 and connector receiving portion 40. Monitoring unit 42 has a terminal portion passing through connector receiving portion 40, and when connector unit 200 is coupled to connector receiving portion 40, it detects a connector signal CNCT from connector unit 200. Connector signal CNCT may be generated from a communication unit (not shown) provided in charging station 300 (FIG. 1).

Components forming vehicle 100 are implemented by coordinated control of HV-ECU 2 and battery ECU 4. HV-ECU 2 and battery ECU 4 are connected to each other through a communication line, allowing exchange of various signals and information.

Battery ECU 4 is a controller mainly managing state of charge and failure detection of power storage unit 6, and, by way of example, it is formed using, as a main body, a micro-computer including a CPU (Central Processing Unit), and a storage such as an ROM (Read Only Memory) and an RAM (Random Access Memory). Specifically, battery ECU 4 calculates state of charge (SOC) of power storage unit 6, based on temperature Tb detected by temperature detecting unit 14, voltage value Vb detected by voltage detecting unit 12, and current value Ib detected by current detecting unit 10. The state of charge (SOC) represents the amount of charge using the fully charged state of the power storage unit as a reference and, by way of example, it is represented by a ratio (0 to 100%) of the current amount of charge with respect to the full charge capacity.

Further, battery ECU 4 transmits the calculated SOC to HV-ECU2, and constantly monitors whether the SOC of power storage unit 6 is within a prescribed standard range or not. If the SOC of power storage unit 6 is out of the standard range (on the excessive discharging side or excessive charging side), power storage unit 6 is determined to be defective, and a signal indicating malfunction of power storage unit 6 (diag-code) is output. The diag-code is stored in a history storage unit (not shown) for maintenance mounted on vehicle 100, and it is also used for visual indication to the user.

HV-ECU 2 is a controller for controlling internal combustion engine 36, converter 8, inverters 30-1 and 30-2, and motor generators 34-1 and 34-2 to generate vehicle driving force in accordance with a request from the driver, when vehicle 100 is running. Similar to battery ECU 4, it is formed using, as a main body, a micro-computer including a CPU and a storage such as an ROM and an RAM. In addition to the control of vehicle driving force, HV-ECU 2 also controls electric power for charging/discharging power storage unit 6.

Vehicle 100 in accordance with Embodiment 1 is a hybrid vehicle that allows external charging, and HV-ECU 2 controls with the running mode successively changed between EV (Electric Vehicle) running mode and HV (Hybrid Vehicle) running mode. Specifically, if an ignition on command (not shown) is given through an operation by the driver, HV-ECU 2 controls the vehicle such that it runs only on the driving force mainly from motor generator 34-2, until SOC of power storage unit 6 becomes lower than a prescribed value (EV running mode).

In the EV running mode, power generating operation of motor generator 34-1 receiving the power from internal combustion engine 36 does not take place, and therefore, charging of power storage unit 6 by motor generator 34-1 is limited. The EV running mode is aimed at improving fuel consumption efficiency by maintaining internal combustion engine 36 in a stopped state. When a driving force request is made by the driver, for example, for rapid acceleration, when a request not related to driving force request is made for warming catalyst or for operating air conditioner, or when other conditions are satisfied, operation of internal combustion engine 36 is started.

In the EV running mode, charging of power storage unit 6 by motor generator 34-1 is limited as described above and, therefore, though power storage unit 6 may possibly be charged by regenerative operation of motor generator 34-2, SOC of power storage unit 6 inevitably lowers. When SOC of power storage unit 6 lowers to the prescribed value as a result, HV-ECU 2 makes a transition to HV running mode, in which charging of power storage unit 6 by motor generator 34-1 is allowed.

Entering the HV running mode, the electric power generated by motor generator 34-1 is limited such that SOC of power storage unit 6 is kept within a prescribed range having a prescribed control center value as a center. In response to the power generating operation by motor generator 34-1, internal combustion engine 36 also starts its operation. It is noted that part of the power generated by the operation of internal combustion engine 36 is used also as a driving force for vehicle 100.

In HV running mode, based on signals from various sensors, state of running, accelerator position (all not shown) and the like, HV-ECU 6 determines target values of rotation speed of internal combustion engine 36, amount of electric power generation by motor generator 34-1 and torque of motor generator 34-2, so that general fuel consumption efficiency can be optimized.

In determining these target values, SOC of power storage unit 6 is also taken into consideration and, the electric power charged/discharged by power storage unit 6 is managed such that SOC of power storage unit 6 is maintained within a prescribed range having, as the center, a prescribed control center value. Specifically, the difference between the electric power generated by motor generator 34-1 receiving part of the power from internal combustion engine 36 and the consumed electric power used by motor generator 34-2 for generating driving force corresponds to the charge/discharge power of power storage unit 6 and, therefore, the amount of electric power generated by motor generator 34-1 and the power consumed by motor generator 34-2 are determined depending on the magnitude of SOC of power storage unit 6. The charge/discharge power of power storage unit 6 is also influenced by the state of running of vehicle 100 and, therefore, the "prescribed range" in which SOC of power storage unit 6 is to be maintained is not always defined clearly.

As described above, in the present embodiment, three manners of power supply, that is, (1) power generating operation of motor generator 34-1 receiving power from internal combustion engine 6, (2) power supply to power storage unit 6 from an external power supply, and (3) regenerative operation by motor generator 34-2, are possible for charging (increasing SOC of) power storage unit 6. Further, as a manner of power consumption, (1) generation of driving force by motor generator 34-2 is possible for discharging (decreasing SOC of) power storage unit 6. The present invention, however, is not limited to the present embodiment, and it is applicable a hybrid vehicle of any structure provided that it includes a structure for charging a power storage unit mounted thereon and a structure consuming the power discharged from the power storage unit, and the charge/discharge power of the power storage unit is controlled such that SOC of the power storage unit is kept within the prescribed range having, as a center, a control center value.

Figure 6:
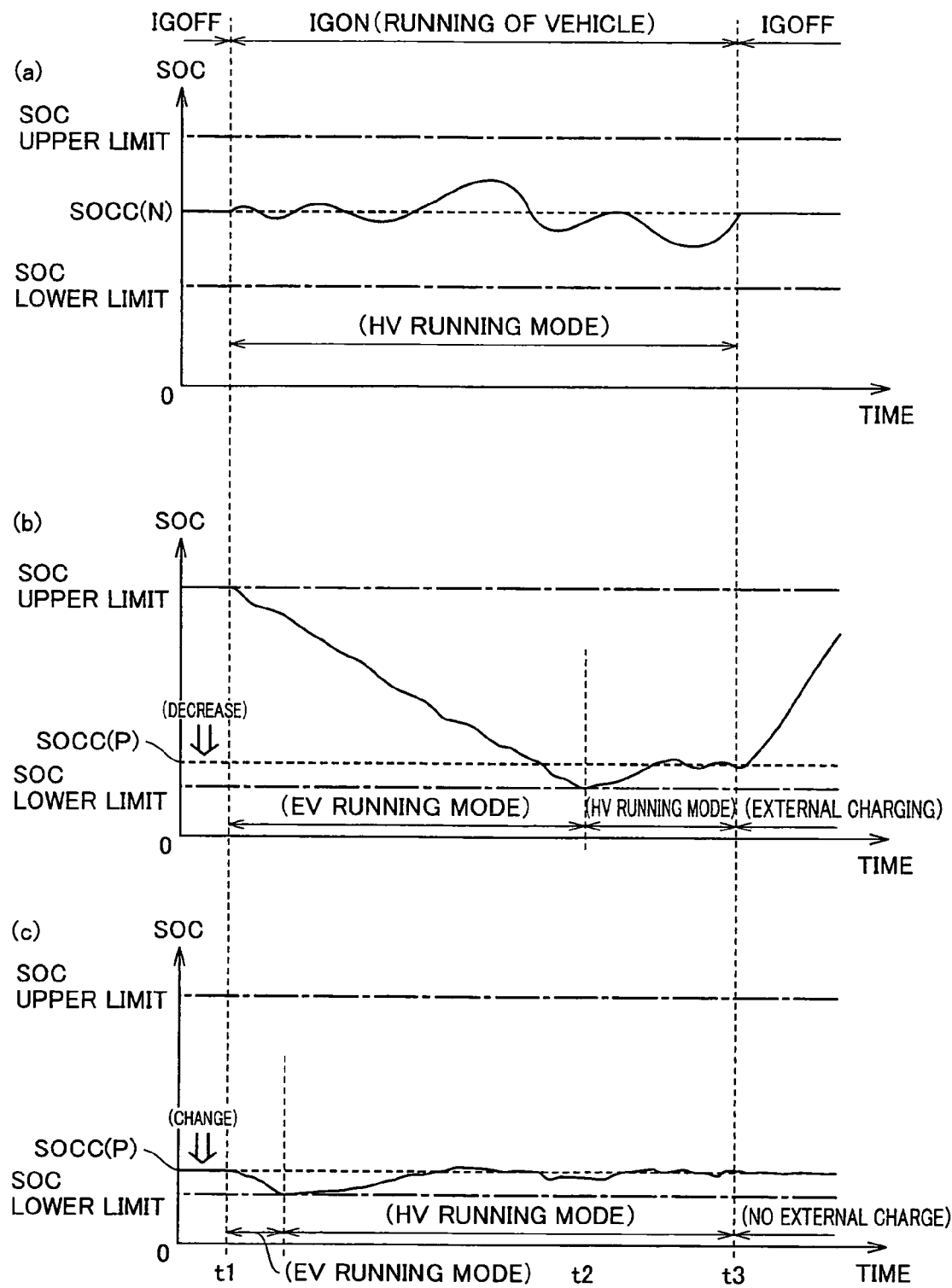
FIG. 6 shows exemplary changes with time of SOC of the power storage unit while the hybrid vehicle runs.

FIG. 6 shows exemplary changes with time of SOC of the power storage unit when the hybrid vehicle runs. FIG. 6(*a*) shows an example in a hybrid vehicle not provided with the external charging function. FIG. 6(*b*) shows an example in which vehicle 100 in accordance with Embodiment 1 is used as originally intended, and FIG. 6(*c*) shows an example in which frequency of external charging of vehicle 100 in accordance with Embodiment 1 is low.

Referring to FIG. 6(*a*), in the hybrid vehicle not provided with the external charging function, a control center value SOCC(N) is set approximately at the midpoint between the upper and lower limits of SOC of power storage unit. In the IGON (vehicle running) period, the power charged/discharged at the power storage unit is controlled such that SOC of the power storage unit is maintained in a prescribed range with the control center value SOCC(N) being the center.

Referring to FIG. 6(*b*), when external charging is executed frequently in vehicle 100 in accordance with Embodiment 1, in the IGOFF period, power storage unit 6 is charged close to the SOC upper limit. When the ignition on command is applied and vehicle 100 starts running (time t1), vehicle 100 runs in the EV running mode. When running in the EV running mode continues and SOC of power storage unit 6 attains lower than the lower limit of SOC (time t2), the running mode switches from EV running mode to HV running mode, in which internal combustion engine 36 (FIG. 2) starts its operation and power storage unit 6 is charged by the electric power generated by motor generator 34-1. Consequently, SOC of power storage unit 6 begins to increase. Here, to be ready for the next external charging, the control center value SOCC(P) in the HV running mode is set lower than the control center value SOCC(N) of FIG. 6(*a*). Specifically, SOC of power storage unit 6 in the HV running mode is relatively closer to the SOC lower limit.

When running of vehicle 100 ends, user couples connector unit 200 (FIGS. 1, 2) to vehicle 100, and external charging starts (time t3). Consequently, SOC of power storage unit 6 begins to increase.

Possible manner of use of vehicle 100 is for commuting. When vehicle 100 is used for commuting, it follows that external charging of vehicle 100 is started mostly after coming home from work. In that case, power storage unit 6 can be externally charged continuously to the next morning and, therefore, power storage unit 6 can almost fully be charged. Therefore, in this manner of use, SOC change such as shown in FIG. 6(*b*) is repeated every day.

If vehicle 100 is not externally charged after the end of running, it follows that SOC of power storage unit 6 is kept at a relatively low value for a long period of time. Specifically, at the time point (time t1) when ignition on command is given, SOC of power storage unit 6 is at a relatively low value as shown in FIG. 6(*c*) and, therefore, transition from the EV running mode to the HV running mode takes place in a relatively short period of time. In the HV running mode, the relatively low control center value SOCC(P) is maintained and, therefore, SOC of power storage unit 6 is maintained at a value close to the SOC lower limit.

Generally, it is not preferable for a secondary battery or an electric double layer capacitor to have its SOC kept close to the SOC upper limit or SOC lower limit for a long period of time, from the viewpoint of degradation. If the frequency of external charging of power storage unit 6 is low, it is determined that such a state not preferable from the viewpoint of degradation continues. Adequate measures must be taken.

Therefore, HV-ECU 2 in accordance with Embodiment 1 monitors the degree of executing external charging of power storage unit 6 (hereinafter also referred to as "external charge execution degree"), and changes the control center value in the HV running mode in accordance with the external charge execution degree. In the present specification, the "external charge execution degree" encompasses concepts of the interval at which external charging is executed (time interval or running distance interval), and the number of executions of external charging in a prescribed period or in a prescribed running distance.

Figure 7:
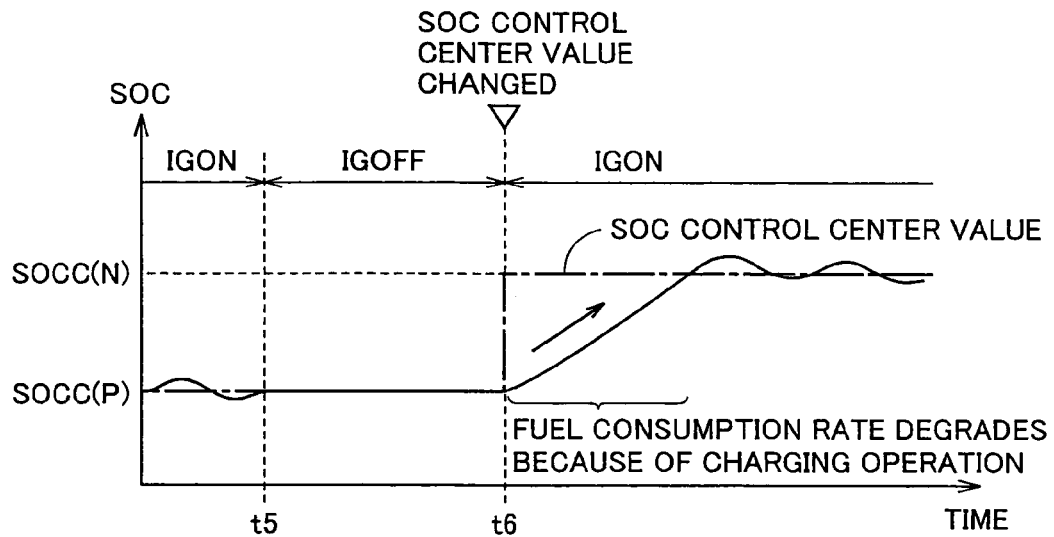
FIG. 7 shows an exemplary change with time of SOC of the power storage unit, when the SOC control center value is changed stepwise from control center value SOCC(P) to SOCC(N).

FIG. 7 shows an exemplary change with time of SOC of power storage unit 6, when the SOC control center value is changed stepwise from control center value SOCC(P) to control center value SOCC(N).

Referring to FIG. 7, for instance, assume that external charging is not executed in the period from the start of ignition off period upon reception of the ignition off command until next IGON state starts (time t5 to t6), that is, in the period in which external charging should take place, and that SOC control center value in the HV running mode is changed stepwise from control center value SOCC(P) to control center value SOCC(N). Here, charging operation is executed to rapidly increase SOC of power storage unit 6 that has been kept close to the control center value SOCC(P) in last running to the control center value SOCC(N). Therefore, in the HV running mode after time t6, charging operation using the power of internal combustion engine 36 is executed actively, possibly decreasing fuel consumption rate.

Therefore, in vehicle 100 in accordance with Embodiment 1, the SOC control center value is changed continuously, in accordance with the degree of execution of external charging (external charge execution degree). More specifically, SOC control center value is increased as the external charge execution degree becomes lower. Here, the external charge execution degree may be determined in various methods. By way of example, the external charge execution degree is determined based on the lapse of time or running distance from the latest executed external charging (last external charging).

In the following, a configuration in which the external charge execution degree is determined mainly based on the lapse of time will be described, and the elapsed time from the latest external charging will be referred to as the "period of no external charge."

Figure 8:
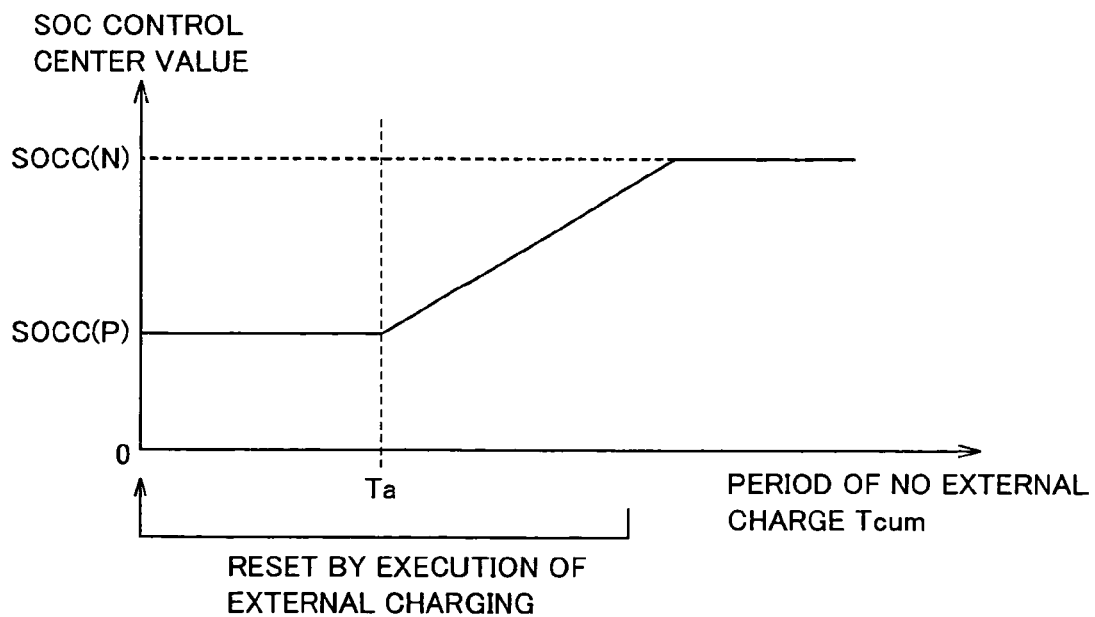
FIG. 8 shows an exemplary change with time of the SOC control center value with respect to a period of no external charge Tcum.

FIG. 8 shows an exemplary change of SOC control center value with respect to the period of no external charge Tcum.

Referring to FIG. 8, HV-ECU 2 continuously integrates the period of no external charge Tcum, and stores the SOC control center value shown in FIG. 8 in a form of a map. When ignition on is applied, the stored map is referred to, and the SOC control center value corresponding to the period of no external charge Tcum at that time point is obtained. Based on the obtained SOC control center value, it executes the charge/discharge management of power storage unit 6 in the HV running mode.

As can be seen from the change characteristic of SOC control center value with respect to the period of no external charge Tcum, until the period of no external charge Tcum exceeds a prescribed threshold value Ta, the SOC control center value is maintained at control center value SOCC(P). The threshold value Ta is determined in consideration of the frequency of external charging performed by the user, degrading influence on power storage unit 6 and the like, and set, for example, to "30 days." If the period of no external charge Tcum exceeds the prescribed threshold value Ta, SOC control center value is increased to control center value SOCC(N).

Further, the period of no external charge Tcum is reset once the external charging is executed and, therefore, the SOC control center value is also updated to control center value SOCC(P) once the external charging is executed.

In the following, a control structure for changing the SOC control center value in the HV running mode, in accordance with the external charge execution degree will be described.

Figure 9:
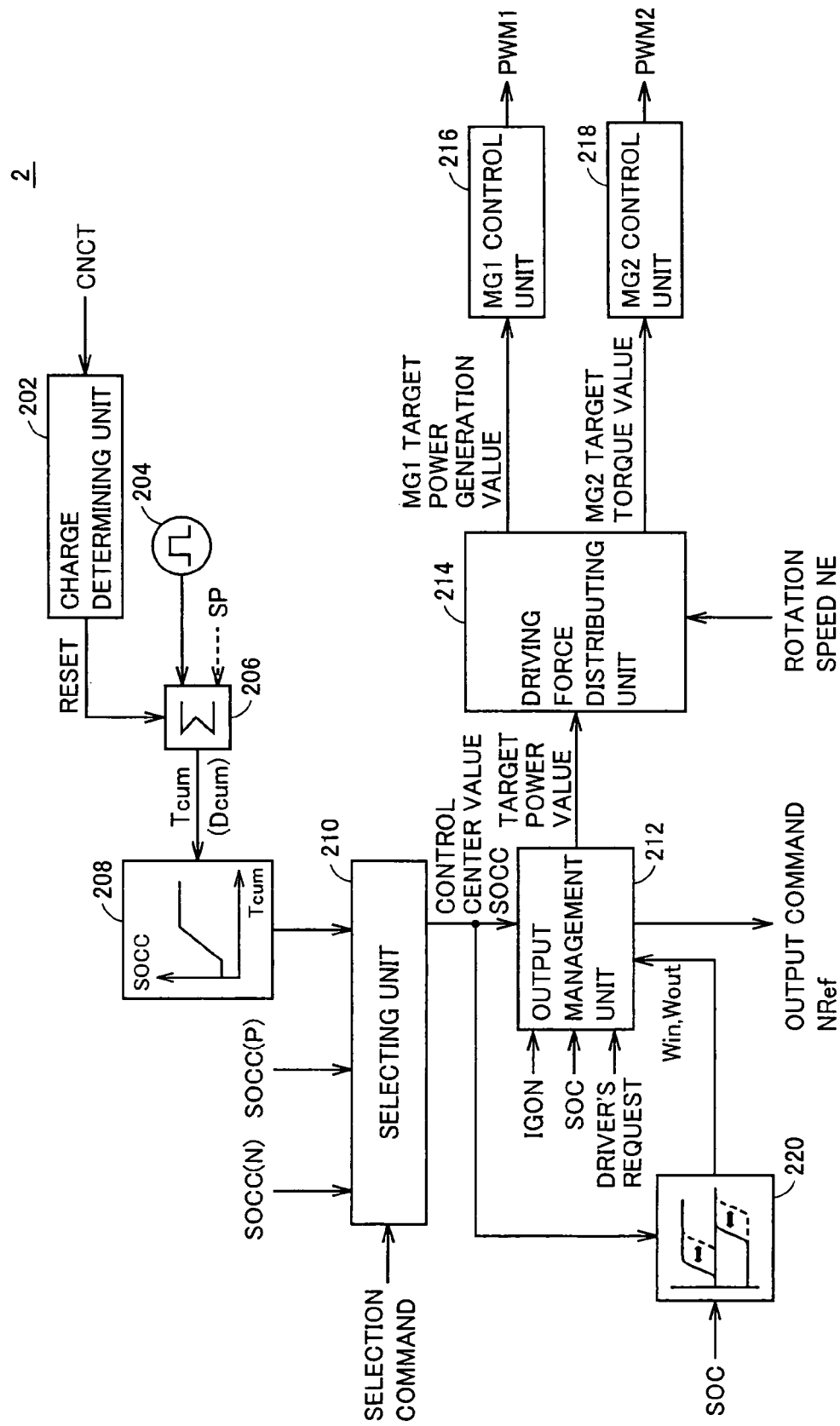
FIG. 9 is a block diagram showing a control structure in an HV-ECU in accordance with Embodiment 1 of the present invention.

Referring to FIG. 9, the control structure of HV-ECU 2 in accordance with Embodiment 1 of the present invention includes a charge determining unit 202, a reference pulse oscillating unit 204, an integrating unit 206, a control center value setting unit 208, a selecting unit 210, an output management unit 212, a driving force distributing unit 214, MG1 control unit 216, MG2 control unit 218, and an allowable charging/discharging power setting unit 220.

Charge determining unit 202 determines execution of external charging, based on the connector signal CNCT detected by monitoring unit 42 (FIG. 2) when connector unit 200 is coupled to connector receiving portion 40. When it is determined by charge determining unit 202 that external charging has been executed, a reset signal RESET is applied to integrating unit 206. Receiving the reset signal RESET from charge determining unit 202, integrating unit 206 resets the integrated value up to that time point, and starts integration of the number of pulses generated at every prescribed unit time from reference pulse oscillating unit 204. Then, integrating unit 206 multiplies the integrated value by the unit time and outputs the result as the period of no external charge Tcum, to control center value setting unit 208. Specifically, integrating unit 206 integrates the time elapsed from the latest execution of external charging. The pulse integration at integrating unit 206 is continued regardless of the state (IGON/IGOFF) of vehicle 100.

Control center value setting unit 208 has SOC control center values stored in correspondence with the period of no external charge Tcum, and when the period of no external charge Tcum is output from integrating unit 206, the SOC control center value corresponding to the SOC control center value is read, and output to selecting unit 210.

Selecting unit 210 provides selection of enabling or disabling the process related to the change of SOC control center value, by the user. Specifically, as shown in FIG. 1, vehicle 100 in accordance with Embodiment 1 has a selection button 24 provided to allow an operation by the driver, for example, and whether the change of SOC control center value is to be enabled or disabled is selected and instructed by the state of selection button 24. In response to the selection instruction generated by the operation of selection button 24, selecting unit 210 selects any of the SOC control center value applied from control center value setting unit 208, control center value SOCC(N) and control center value SOCC(P) as the control center value SOCC, and outputs it to output management unit 212.

If the user intends to actively use the external charging function, the user disables the change of SOC control center value using selection button 24, and fixes the control center value SOCC at the control center value SOCC(P). If the user does not at all intend to use the external charging function, the user may fix the control center value SOCC at SOCC (N).

Receiving an ignition on command through an operation by the driver, the EV running mode is set, and output management unit 212 determines a target power value in accordance with the driver's request and applies it to driving force distributing unit 214. Then, an MG2 target torque value for motor generator 34-2 in accordance with the target power value is calculated by driving force distributing unit 214, and switching command PWM1 for controlling inverter 30-1 is generated by MG2 control unit 218, in accordance with the target torque value.

When SOC of power storage unit 6 becomes lower than the SOC lower limit during execution of EV running mode, output management unit 212 changes the operation mode from EV running mode to HV running mode. Then, output management unit 212 determines the target power value corresponding to the power to be charged/discharged at power storage unit 6, so that SOC of power storage unit 6 is maintained within the prescribed range with control center value SOCC being the center, and applies it to driving force distributing unit 214. Here, as the control center value SOCC, the value that has been output from control center value setting unit 208 at the time of application of ignition on command by the operation by the driver is used.

Further, output management unit 212 determines the target power value within the range of maximum power value (allowable charging power Win and allowable discharging power Wout) that can be charged/discharged at power storage unit 6, set by allowable charging/discharging power setting unit 220. Further, in order to generate the vehicle driving force to meet the driver's request, output management unit 212 determines, in addition to the target power value determined under the conditions described above, an output command Nref for internal combustion engine 36.

Allowable charging/discharging power setting unit 220 stores allowable charging/discharging power characteristics of allowable charging power Win1 and allowable discharging power Wout1 defined in correspondence with SOC of power storage unit 6 in the form of a map. The stored map is looked up based on the SOC of power storage unit 6 at each time point, and the corresponding allowable charging power Win and allowable discharging power Wout are applied to output management unit 212. Further, allowable charging/discharging power setting unit 220 changes the allowable charging/ discharging power characteristic in accordance with the control center value SOCC, as will be described later.

Driving force distributing unit 214 distributes the target power value determined by output management unit 212 based on the engine speed NE of internal combustion engine 36, and calculates MG1 power generation target value for motor generator 34-1 and MG2 target torque value for motor generator 34-2.

MG1 control unit 216 and MG2 control unit 218 are each formed including a feedback control system. MG1 control unit 216 generates switching command PWM1 for inverter 30-1 so that the power generated by motor generator 34-1 matches the MG1 power generation target value. Further, MG2 control unit 218 generates switching command PWM2 for inverter 30-2 so that the driving torque generated by motor generator 34-2 matches MG2 target torque value.

In the foregoing, a structure has been described as an example in which integrating unit 206 integrates the period of no external charge Tcum based on the number of pulses generated by reference pulse oscillating unit 204. It is also possible to calculate a distance with no external charge Dcum, by integrating vehicle speed SP of vehicle 100 detected by vehicle speed detecting unit 16 (FIG. 2). The distance with no external charge Dcum represents running distance from the latest external charging (last external charging). Even when the distance with no external charge Dcum is used in place of the period of no external charge Tcum, the control is the same except that the SOC control center values corresponding to the distance with no external charge Dcum are stored in control center value setting unit 208. Therefore, detailed description thereof will not be repeated.

By the control structure as described above, the processes of changing SOC control center value in HV running mode in accordance with the present embodiment are implemented. The above-described processes can be represented by the following process flow.

Figure 10:
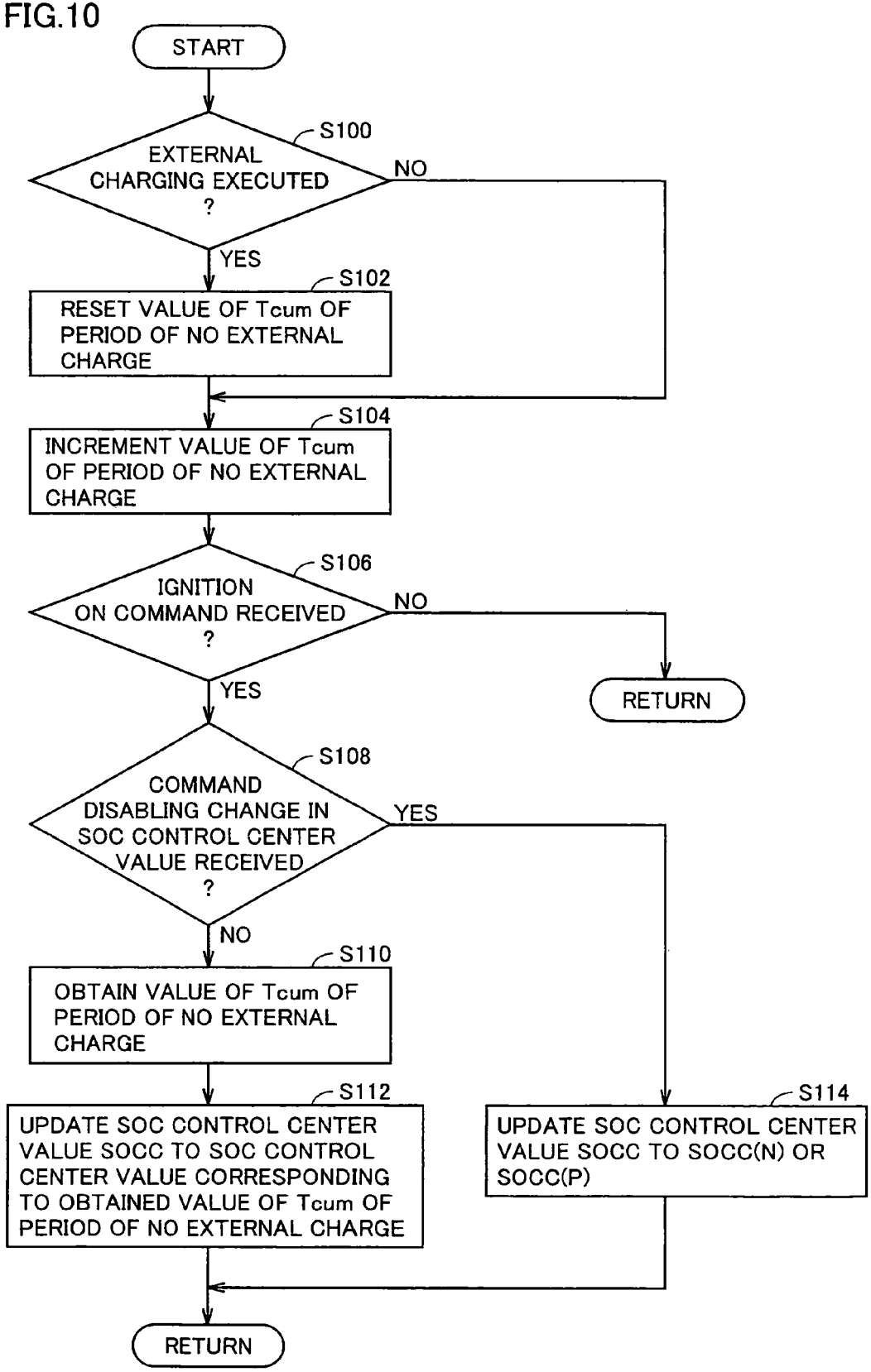
FIG. 10 is a flowchart related to a method of changing SOC control center value in accordance with Embodiment 1 of the present invention.

FIG. 10 is a flowchart related to a method of changing SOC control center value in accordance with Embodiment 1 of the present invention. The flowchart shown in FIG. 10 can be implemented by HV-ECU 2 and battery ECU 4 executing programs stored in advance.

Referring to FIG. 10, first, in order to execute the process for integrating the period of no external charge Tcum, whether external charging has been executed or not is determined (step S100). If it is determined that external charging has been done (YES at step S100), the value Tcum of period of no external charge is reset (step S102). After the reset of period of no external charge Tcum (step S102), or if it is determined that external charging has not been done (NO at step S100), the value Tcum of period of no external charge at that time point is incremented (step S104).

Next, in order to execute updating of SOC control center value, whether the ignition on command has been applied or not is determined (step S106). If the ignition on command has not been applied (NO at step S106), the process returns to the start.

If ignition on command has been applied (YES at step S106), whether a command to instruct disabling of the change in SOC control center value has been applied by selection button 24 (FIG. 2) or not is determined (step S108). If the command to instruct disabling of the change in SOC control center value has not been applied (NO at step S108), the value Tcum of period of no external charge is obtained (step S110), and the SOCC control center value in the HV running mode is updated to the SOC control center value corresponding to the obtained value Tcum of period of no external charge (step S112).

On the other hand, if the command to instruct disabling of the change in SOC control center value has been applied (YES at step S108), the control center value SOCC in the HV running mode is updated to control center value SOCC(N) or control center value SOCC(P) (step S114).

When the process for updating control center value SOCC is done (step S112 or S114), the process returns to the start.

(Change of Allowable Charging/Discharging Power Characteristic)

It is desired at allowable charging/discharging power setting unit 220 included in the control structure of HV-ECU 2 shown in FIG. 9 that the allowable charging/discharging power characteristic is changed in accordance with the control center value SOCC.

Figure 11:
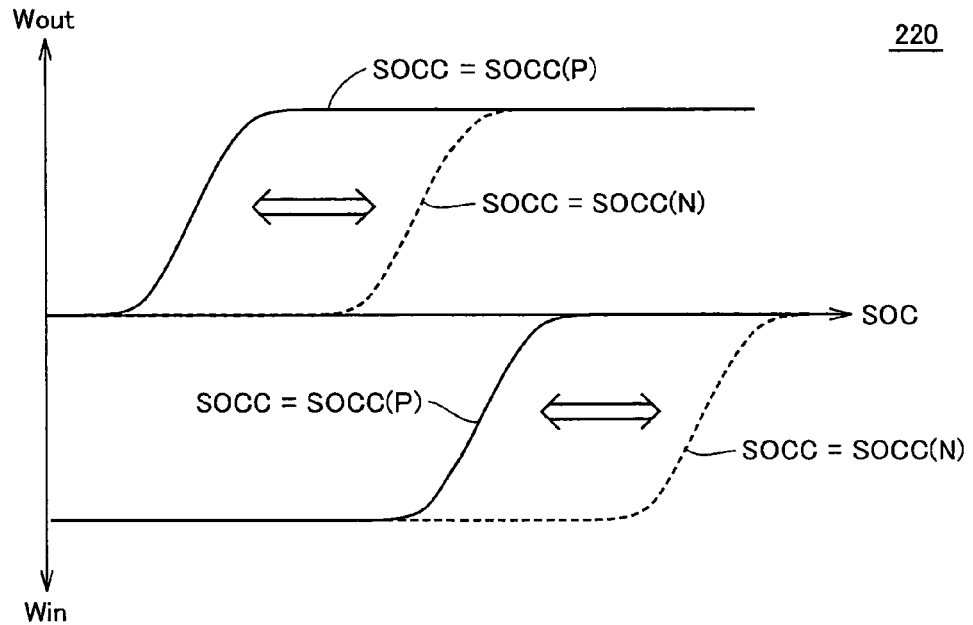
FIG. 11 shows an example of allowable charge/discharge power characteristic, stored in an allowable charge/discharge power setting unit.

FIG. 11 shows an example of allowable charging/discharging power characteristic stored in allowable charging/discharging power setting unit 220. Referring to FIG. 11, allowable charging/discharging power setting unit 220 stores the allowable charging power Win and allowable discharging power Wout (allowable charging/discharging characteristic) in correspondence with SOC of power storage unit 6, and changes the allowable charging/discharging power in accordance with the set control center value SOCC. In the HV running mode, charging/discharging is controlled such that SOC of power storage unit 6 is maintained within a prescribed range with a prescribed control center value being the center and, therefore, the allowable charging/discharging power characteristic that can realize this control of power storage unit 6 is set. At the same time, the allowable charging/discharging characteristic that can avoid excessive charging and discharging of power storage unit 6 must be used.

As an example, allowable charging/discharging power setting unit 220 is adopted such that the allowable charging power Win and the allowable discharging power Wout are shifted as a whole, linked with the set control center value SOCC. Such a change of allowable charging/discharging power characteristic can be implemented by storing a plurality of allowable charging/discharging power characteristics in the form of a map in allowable charging/discharging characteristic setting unit 220 and by selecting the allowable charging/discharging power characteristic in accordance with the control center value SOCC.

As the allowable charging/discharging power characteristic is changed in accordance with the set control center value SOCC, charge/discharge control of power storage unit 6 can be executed in an appropriate manner even when the control center value SOCC is changed, and excessive charging and discharging of power storage unit 6 can be avoided.

(Change of Characteristic Values of Control Elements in Converter Control System)

HV-ECU 2 includes a control system for controlling the voltage converting operation of converter 8. Generally, an internal resistance value of a secondary battery or an electric double layer capacitor tends to increase as SOC becomes lower. Specifically, when control center value SOCC is set low and SOC of power storage unit 6 is kept low, input/output impedance to power storage unit 6 increases. Therefore, the voltage converting operation of converter 8 must be executed with higher response as SOC of power storage unit 6 attains lower.

Therefore, in HV-ECU 2 in accordance with Embodiment 1, characteristic values of control elements included in the control system for controlling the voltage converting operation of converter 8 are changed such that optimal voltage converting operation is executed in accordance with the control center value SOCC.

Figure 12:
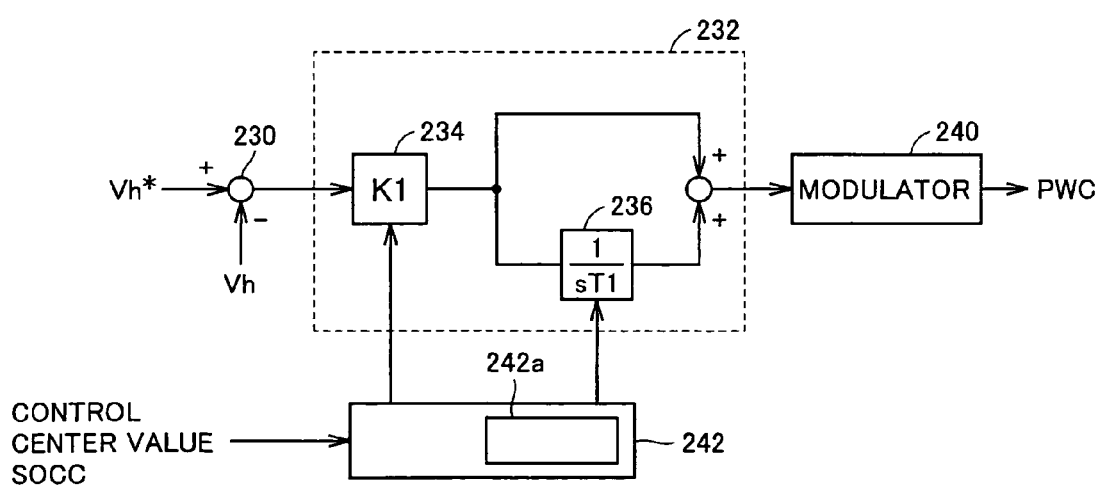
FIG. 12 is a block diagram showing a control structure for controlling a voltage converting operation of a converter included in the HV-ECU in accordance with Embodiment 1 of the present invention.

FIG. 12 is a block diagram showing a control structure for controlling the voltage converting operation of converter 8 included in HV-ECU 2 in accordance with Embodiment 1 of the present invention.

Referring to FIG. 12, the control structure of HV-ECU 2 includes a deviation calculating unit 230, a PI control unit 232, a modulator 240, and a characteristic value changing unit 242. FIG. 12 shows a feedback control system to have voltage value Vh between main positive line MPL and main negative line MNL match a target voltage value Vh*.

Deviation calculating unit 230 calculates a voltage deviation of voltage Vh from target voltage value Vh*. PI control unit 32 includes a proportional element (P) 234 and an integral element (I) 236, receives the voltage deviation calculated at deviation calculating unit 230, and calculates a PI output value in accordance with characteristic values (proportional gain K1 and integration time T1) of each element. Then, the PI output value calculated by PI control unit 232 is applied to modulator 240. Modulator 240 compares the PI output value with a carrier wave generated by an oscillating unit, not shown, and generates switching command PWC.

Here, characteristic value changing unit 242 includes a gain storage unit 242a storing a plurality of sets of proportional gain K1 and integration time T1, in correspondence with control center value SOCC. In accordance with the control center value SOCC output from selecting unit 210, characteristic value changing unit 242 selects a corresponding set of proportional gain K1 and integration time T1, and sets the values of selected set in proportional element 234 and integral element 236, respectively.

The values of proportional gain K1 and integration time T1 included in each set are calculated based, for example, on the internal resistance value of power storage unit 6 measured experimentally.

As described above, the characteristic values of control elements included in the control system for controlling the voltage converting operation of converter 8 are changed in accordance with the set control center value SOCC and, therefore, even if internal resistance of power storage unit 6 fluctuates, charging/discharging power of power storage unit 6 can optimally be controlled.

(Change of Standard Range for Monitoring Power Storage Unit)

As described above, battery ECU constantly monitors whether SOC of power storage unit 6 is within a prescribed standard range or not, and if SOC of the power storage unit 6 goes out of the standard range (on the side of excessive charging or discharging), it outputs a diag-code. It is desirable to change the standard range for monitoring power storage unit 6 in accordance with control center value SOCC.

Figure 13:
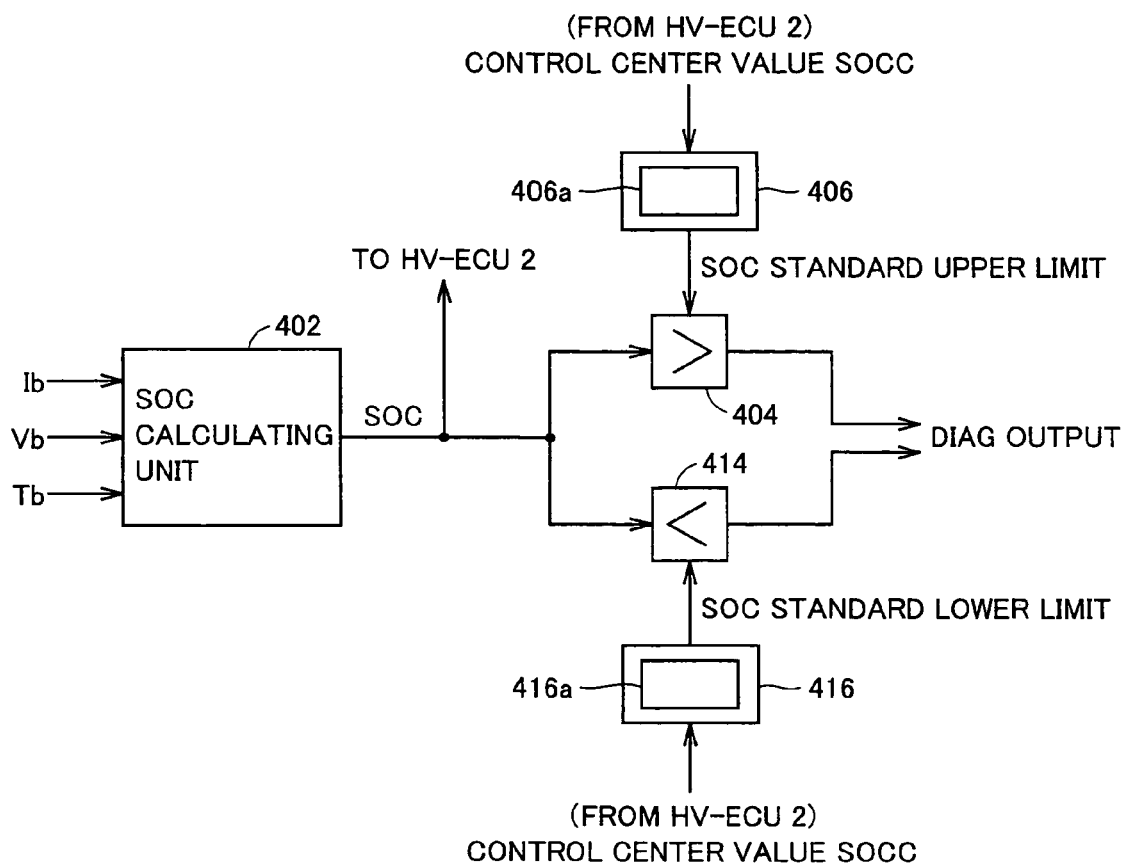
FIG. 13 is a block diagram showing a control structure in a battery ECU in accordance with Embodiment 1 of the present invention.

FIG. 13 is a block diagram showing a control structure of battery ECU 4 in accordance with Embodiment 1 of the present invention.

Referring to FIG. 13, battery ECU 4 calculates SOC of power storage unit 6, and based on the calculated SOC, determines whether there is any malfunction in power storage unit 6. The control structure of battery ECU 4 includes an SOC calculating unit 402, an SOC standard upper limit setting unit 406, an SOC standard lower limit setting unit 416, and comparing units 404 and 414.

SOC calculating unit 402 calculates SOC of power storage unit 6, and outputs the calculated SOC to HV-ECU 4 (FIG. 2) and comparing units 404 and 414. Though various known methods may be used for calculating SOC, SOC calculating unit 402 executes, by way of example, a method using a tentative SOC calculated from open-circuit voltage value and a corrected SOC calculated from integrated value of current value Ib. Specifically, the open-circuit voltage value of power storage unit 6 is calculated based on current value Ib and voltage value Vb at each time point, and from a value corresponding to the open-circuit voltage value on a reference charge/discharge characteristic measured experimentally in advance, tentative SOC of power storage unit 6 is determined. Further, from the integrated value of current value Ib, corrected SOC is derived, and by adding the corrected SOC and tentative SOC, SOC is provided.

Comparing unit 404 compares the SOC of power storage unit 6 calculated by SOC calculating unit 402 with the SOC upper limit value set by SOC standard upper limit setting unit 406, and if the SOC of power storage unit 6 exceeds the SOC standard upper limit, it outputs a diag-code notifying that SOC of power storage unit 6 is on the side of excessive charging.

Similarly, comparing unit 414 compares the SOC of power storage unit 6 calculated by SOC calculating unit 402 with the SOC lower limit value set by SOC standard lower limit setting unit 416, and if the SOC of power storage unit 6 is below the SOC standard lower limit, it outputs a diag-code notifying that SOC of power storage unit is on the side of excessive discharging.

If the control center value SOCC is changed, the range in which SOC of power storage unit 6 is maintained also changes and, therefore, the SOC standard upper limit and the SOC standard lower limit corresponding to the range of controlling SOC of power storage unit 6 must be set. Therefore, SOC standard upper limit setting unit 406 and SOC standard lower limit setting unit 416 change SOC standard upper limit and SOC standard lower limit, in accordance with the control center value SOCC.

Specifically, SOC standard upper limit setting unit 406 and SOC standard lower limit setting unit 416 include standard value storage units 406a and 406b storing a plurality of SOC standard upper limits and SOC standard lower limits in correspondence with control center value SOCC, respectively. In accordance with the control center value SOCC output from selecting unit 210, SOC standard upper limit setting unit 406 and SOC standard lower limit setting unit 416 select the corresponding SOC standard upper limit and SOC standard lower limit from reference value storage units 406a and 406b, respectively, and apply the selected values to comparing units 404 and 414, respectively.

As the SOC reference upper limit and SOC standard lower limit are changed in accordance with the set control center value SOCC, whether there is any malfunction in power storage unit 6 or not can be monitored in a manner linked with the change of control center value SOCC.

According to Embodiment 1 of the present invention, after the transition from EV running mode to HV running mode, the SOC control center value as the target value for controlling SOC of power storage unit 6 increases depending on the external charge execution degree. The external charge execution degree is determined based on the elapsed time or running distance from the latest external charging (last external charging). Therefore, even if the user does not frequently execute external charging, the low SOC state of power storage unit 6 kept for a long period of time can be avoided, and hence, degradation of power storage unit 6 caused by low SOC can be prevented.

Therefore, the user who positively executes external charging can enjoy the merits, and the user who does not frequently execute external charging can use the hybrid vehicle in a manner that prevents degradation of power storage unit 6.

Embodiment 2

In vehicle 100 in accordance with Embodiment 1 above, the structure that directly changes control center value SOCC in HV running mode has been described. It is also possible to substantially change the control center value SOC by changing the required charging power value determined in accordance with SOC of power storage unit 6. In Embodiment 2, a structure will be described in which control center value SOCC is substantially changed by changing the required charging power characteristic.

The structure for externally charging a hybrid vehicle 100A in accordance with Embodiment 2 is the same as that shown in FIG. 1 and, therefore, detailed description thereof will not be repeated. Further, schematic structure of hybrid vehicle 100A is also similar to that of FIG. 2 except for the control structure of HV-ECU 2, and therefore, detailed description thereof will not be repeated.

Figure 14:
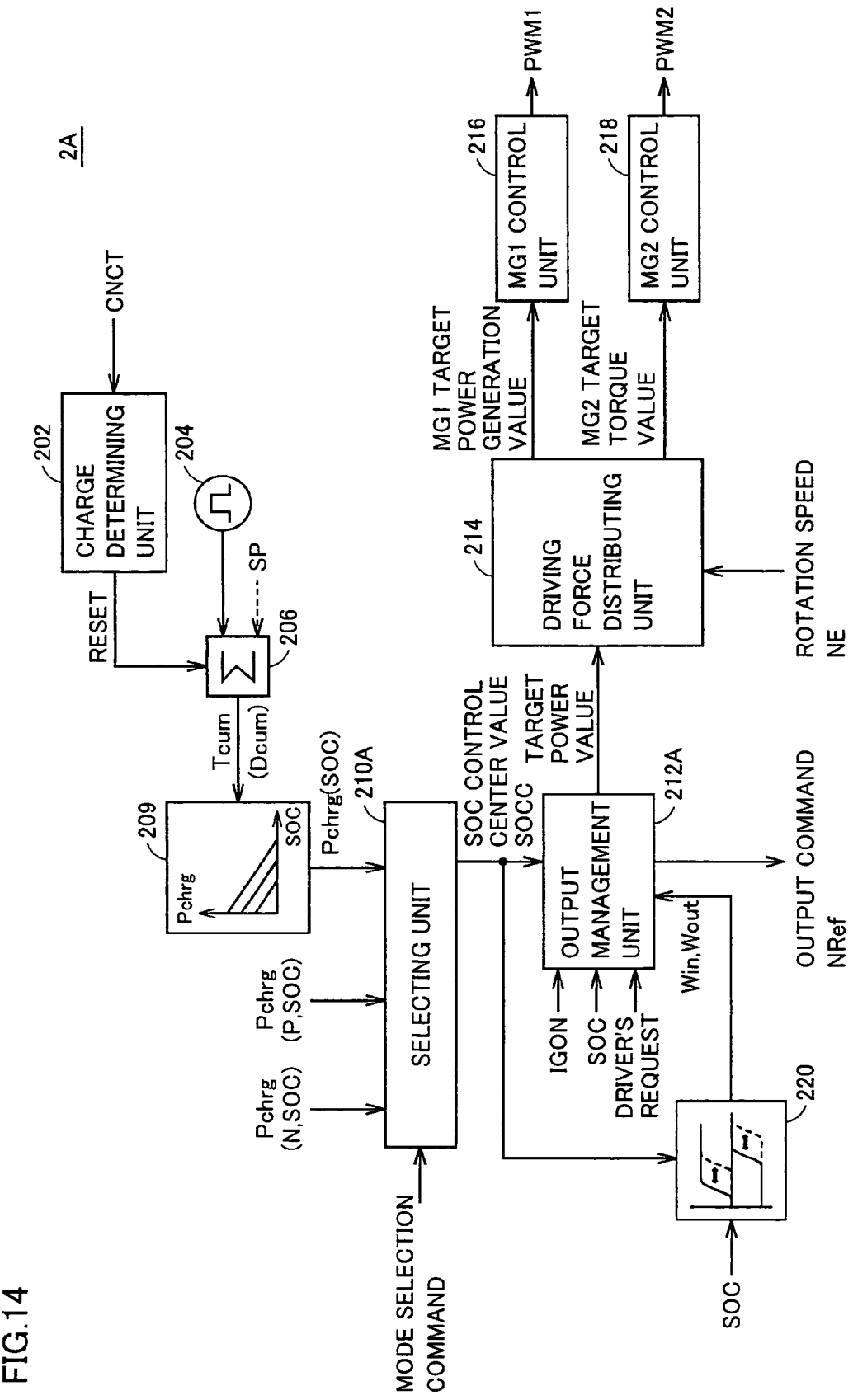
FIG. 14 is a block diagram showing a control structure in an HV-ECU in accordance with Embodiment 2 of the present invention.

FIG. 14 is a block diagram showing the control structure of HV-ECU 2A in accordance with Embodiment 2 of the present invention.

Referring to FIG. 14, the control structure of HV-ECU 2A corresponds to the control structure of HV-ECU 2A shown in FIG. 9, and it includes a required charging power setting unit 209, a selecting unit 210A, and an output management unit 212A, in place of control center value setting unit 208, selecting unit 210 and output management unit 212, respectively.

Required charging power setting unit 209 applies required charging power characteristic defining the power necessary for charging power storage unit 6, in correspondence with SOC of power storage unit 6, through selecting unit 210A to output management unit 212A. Specifically, charging/discharging of power storage unit 6 is controlled in accordance with the required power value defined by the required charging power characteristic.

Figure 15:
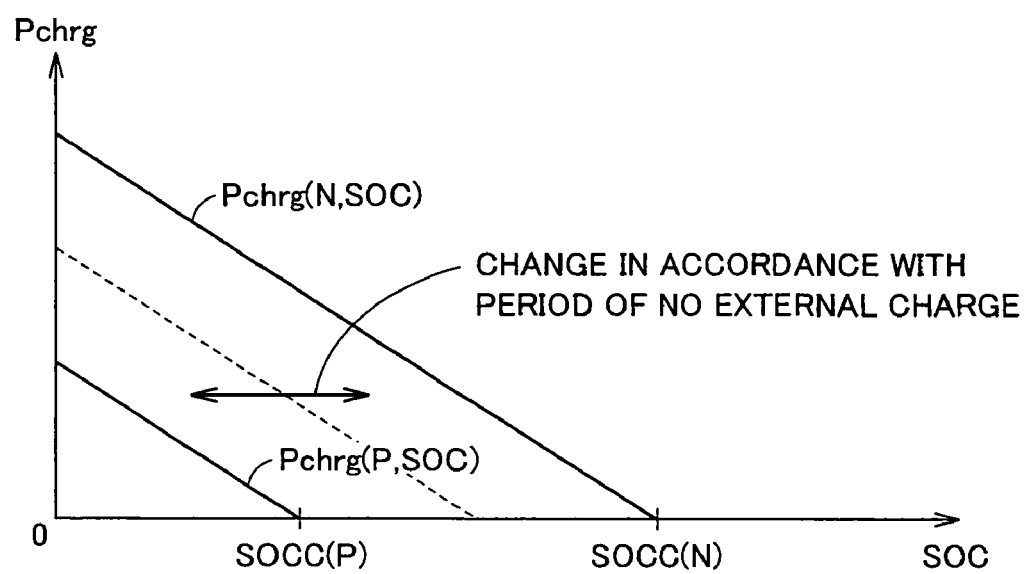
FIG. 15 shows an example of a required charging power characteristic stored in a required charging power setting unit.

FIG. 15 shows an example of required charging power characteristic, stored in required charging power setting unit 209. Referring to FIG. 15, the required charging power characteristic is defined such that the value of required charging power Pchrg increases as the SOC of power storage unit 6 decreases. Consequently, when SOC of power storage unit 6 decreases, charging is done more actively and charge control is executed in a direction of increasing SOC of power storage unit 6. Here, SOC at which required charging power Pchrg attains to "0" corresponds to the control center value SOCC. Specifically, charging request for power storage unit 6 continues until the required charging power Pchrg attains to "0" and, therefore, SOC of power storage unit 6 is controlled with SOC attaining Pchrg of "0" being a target.

Therefore, required charging power setting unit 209 changes the required charging power characteristic Pchrg (SOC) in accordance with the period Tcum of no external charge, and thereby substantially changes the control center value SOCC. As compared with the change in SOC control center value shown in FIG. 8, required charging power setting unit 209 continuously changes the required charging power characteristic Pchrg(SOC) between two required charging power characteristics at which required charging power value Pchrg attains to "0", at control center values SOCC(P) and SOCC(N).

Again referring to FIG. 14, the required charging power characteristic Pchrg(SOC) set by required charging power setting unit 209 is output to selecting unit 210A.

Selecting unit 210A outputs, depending on the state of selection button 24 (FIG. 2) operated by the driver, one of the required power characteristic Pchrg(SOC) set by required charging power setting unit 209, the required charging power characteristic Pchrg(N, SOC) corresponding to the control center value SOCC(N) and required charging power characteristic Pchrg(P, SOC) corresponding to the control center value SOCC(P), to output management unit 212A. This is to select enabling or disabling of the change in SOC control center value by the user, similar to selecting unit 210 shown in FIG. 9.

After the transition from EV running mode to HV running mode, output management unit 212A determines a target power value corresponding to the power for charging/discharging power storage unit 6, in accordance with the required charging power characteristic.

Except for these points, it is the same as HV-ECU 2 shown in FIG. 9 and, therefore, detailed description thereof will not be repeated.

According to Embodiment 2 of the present invention, after the transition from EV running mode to HV running mode, the required charging power characteristic used to control charging/discharging of power storage unit 6 is changed in accordance with the external charge execution degree. By the change of required charging power characteristic, the SOC control center value for power storage unit 6 is substantially changed. Therefore, effects similar to those of Embodiment 1 can be attained. Further, according to Embodiment 2 of the present invention, as compared with direct changing of SOC control center value, more flexible charge/discharge control becomes possible. Therefore, it is possible to increase SOC control center value when the external charge execution degree is low, while maintaining high fuel consumption efficiency.

In Embodiments 1 and 2 above, the elapsed time from the latest external charging (last external charging) is calculated by integrating number of pulses generated by reference pulse oscillating unit 204. Other than this method, the elapsed time may be calculated, for example, based on the time obtained by GPS (Global Positioning System) used for car navigation system. Further, the external charge execution degree may be calculated based on the amount of charging per one charging operation, other than the elapsed time or running distance from the latest external charging.

In Embodiments 1 and 2 above, a structure has been described in which the external power (single-phase AC) input to the neutral points of two motor generators is converted to DC power using corresponding two inverters for charging the power storage unit. The structure is not limiting. By way of example, a power converting device (a rectifier) may be separately provided for converting the external power supply and providing power (DC power) for charging the power storage unit.

Further, though a so-called series/parallel type hybrid vehicle, in which two motor generators realize the "power generating means (or power generating mechanism)" and the "driving force generating means (or driving force generating mechanism)" has been described as an example in Embodiments 1 and 2 above, the present invention is similarly applicable to a series type or parallel type hybrid vehicle in which one motor generator realizes the "power generating means (or power generating mechanism)" and the "driving force generating means (or driving force generating mechanism)"

Although the present invention has been described and illustrated in detail, it is clearly understood that the same is by way of illustration and example only and is not to be taken by way of limitation, the scope of the present invention being interpreted by the terms of the appended claims.

The invention claimed is:
1. A hybrid vehicle, comprising:
an engine operating on fuel combustion;
power generating means capable of generating electric power, receiving power generated by the operation of said engine;

a power storage unit charged by the electric power from said power generating means;

driving force generating means for generating driving force from the electric power from at least one of said power generating means and said power storage unit;

external charging means electrically connected to an external power supply, for charging said power storage unit by said external power supply; and a control unit for controlling vehicle driving force to be generated in accordance with a driver's request, and for controlling electric power charged/discharged at said power storage unit; wherein said control unit controls in a first running mode until a value of state of charge of said power storage unit attains lower than a prescribed value, and makes a transition to a second running mode when said value of state of charge becomes lower than the prescribed value;

in said first running mode, charging of said power storage unit by said power generating means is limited, and in said second running mode, charging of said power storage unit by said power generating means is allowed such that said value of state of charge is maintained in a prescribed range with a control center value being the center; and said control unit includes control center value changing means for changing said control center value in accordance with an external charge execution degree as a degree of executing charging of said power storage unit by said external charging means.

2. The hybrid vehicle according to claim 1, wherein
said control unit controls electric power charged/discharged at said power storage unit in accordance with a required charging power characteristic defining electric power necessary for charging said power storage unit in correspondence with the value of state of charge of said power storage unit; and
said control center value changing means changes said control center value by changing said required charging power characteristic.

3. The hybrid vehicle according to claim 1, wherein
said control center value changing means increases said control center value as said external charge execution degree decreases.

4. The hybrid vehicle according to claim 1, wherein
said control center value changing means determines said external charge execution degree based on at least one of elapsed time and running distance from latest execution of charging of said power storage unit by said external power supply.

5. The hybrid vehicle according to claim 4, wherein
said control center value changing means changes said control center value if at least one of said elapsed time and said running distance exceeds corresponding prescribed threshold value.

6. The hybrid vehicle according to claim 1, wherein
said control unit controls electric power charged/discharged at said power storage unit, within a range of allowable charging/discharging characteristic defining maximum charging/discharging electric power allowable in said power storage unit in correspondence with a value of state of charge of said power storage unit; and
said allowable charging/discharging power characteristic changes in accordance with said control center value changed by said control center value changing means.

7. The hybrid vehicle according to claim 1, further comprising
a voltage converting unit arranged between said power storage unit and said driving force generating means, for performing voltage conversion between said power storage unit and said driving force generating means; wherein
said control unit further includes a control system including at least one control element and for controlling the voltage converting operation at said voltage converting unit; and
characteristic of said at least one control element included in said control system changes in accordance with said control center value that is changed by said control center value changing means.

8. The hybrid vehicle according to claim 1, further comprising
power storage unit monitoring means for monitoring the value of state of charge of said power storage unit and if said value of state of charge is outside a prescribed standard range, outputting a signal indicating malfunction of said power storage unit; wherein
said standard range used by said power storage unit monitoring means changes in accordance with said control center value that is changed by said control center value changing means.

9. The hybrid vehicle according to claim 1, wherein
said control center value changing means is enabled or disabled in accordance with an externally input selection command.

10. A hybrid vehicle, comprising:
an engine operating on fuel combustion;
a power generating mechanism capable of generating electric power, receiving power generated by the operation of said engine;
a power storage unit charged by the electric power from said power generating mechanism;
a driving force generating mechanism for generating driving force from the electric power from at least one of said power generating mechanism and said power storage unit;
an external charging mechanism electrically connected to an external power supply, for charging said power storage unit by said external power supply; and
a control unit for controlling vehicle driving force to be generated in accordance with a driver's request, and for controlling electric power charged/discharged at said power storage unit; wherein
said control unit controls in a first running mode until a value of state of charge of said power storage unit attains lower than a prescribed value, and makes a transition to a second running mode when said value of state of charge becomes lower than the prescribed value;
in said first running mode, charging of said power storage unit by said power generating mechanism is limited, and in said second running mode, charging of said power storage unit by said power generating mechanism is allowed such that said value of state of charge is maintained in a prescribed range with a control center value being the center; and
said control unit changes said control center value in accordance with an external charge execution degree as a degree of executing charging of said power storage unit by said external charging mechanism.

* * * * *